US012744002B2

(12) United States Patent
Choi et al.

(10) Patent No.: US 12,744,002 B2
(45) Date of Patent: Sep. 22, 2026

(54) FREQUENCY VARIABLE DISPLAY DEVICE AND FLICKER COMPENSATION METHOD OF THE SAME

(71) Applicant: LG Display Co., Ltd., Seoul (KR)

(72) Inventors: Seok Min Choi, Paju-si (KR); Jin Sang Lee, Paju-si (KR); Moo Kyoung Hong, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/944,865

(22) Filed: Nov. 12, 2024

(65) Prior Publication Data

US 2025/0218371 A1 Jul. 3, 2025

(30) Foreign Application Priority Data

Dec. 29, 2023 (KR) ........................ 10-2023-0197157

(51) Int. Cl.
*G09G 3/3233* (2016.01)
*G09G 3/32* (2016.01)
*G09G 3/3266* (2016.01)

(52) U.S. Cl.
CPC ............. *G09G 3/3233* (2013.01); *G09G 3/32* (2013.01); *G09G 3/3266* (2013.01); *G09G 2310/067* (2013.01); *G09G 2310/08* (2013.01); *G09G 2320/0233* (2013.01); *G09G 2320/0242* (2013.01); *G09G 2320/0247* (2013.01); *G09G 2320/029* (2013.01); *G09G 2320/0626* (2013.01); *G09G 2330/028* (2013.01); *G09G 2340/0435* (2013.01)

(58) Field of Classification Search
CPC ............. G09G 3/3233; G09G 2310/08; G09G 2320/0233; G09G 2320/0247; G09G 2320/0626; G09G 3/3291; G09G 2320/0295; G09G 2320/029; G09G 3/3258; G09G 2320/0242; G09G 2310/066; G09G 3/2074; G09G 2320/062
See application file for complete search history.

(56) References Cited

U.S. PATENT DOCUMENTS

| | | | | |
|---|---|---|---|---|
| 10,957,249 | B2 * | 3/2021 | Lee | G09G 3/3233 |
| 11,127,357 | B2 * | 9/2021 | Ryu | G09G 3/3291 |
| 11,170,690 | B2 * | 11/2021 | Fores Herranz | G09G 5/10 |
| 11,657,769 | B1 * | 5/2023 | Jang | G09G 3/3208 345/690 |
| 12,597,374 | B2 * | 4/2026 | Kim | G06F 1/1652 |
| 2013/0215094 | A1 * | 8/2013 | Choi | G09G 3/2025 345/211 |

(Continued)

*Primary Examiner* — Dismery Mercedes
(74) *Attorney, Agent, or Firm* — Seed Intellectual Property Law Group LLP

(57) ABSTRACT

A frequency variable display apparatus includes a display panel where a plurality of subpixels are provided, an image driving circuit configured to write an input image in the plurality of subpixels in a vertical active period, where a data enable signal swings, of one frame to implement target luminance in the plurality of subpixels, and a flicker compensation circuit configured to cause a leakage current flowing from the plurality of subpixels to signal lines corresponding thereto in a vertical blank period, where the data enable signal does not swing, of the one frame to implement flicker compensation luminance which is lower than the target luminance in the plurality of subpixels.

14 Claims, 15 Drawing Sheets

(56) References Cited

U.S. PATENT DOCUMENTS

| | | | | |
|---|---|---|---|---|
| 2015/0170578 | A1* | 6/2015 | Choi | G09G 3/3266<br>345/212 |
| 2016/0035260 | A1* | 2/2016 | Kim | G09G 3/3614<br>345/212 |
| 2016/0124491 | A1* | 5/2016 | An | G06F 1/3265<br>713/323 |
| 2018/0090073 | A1* | 3/2018 | Lee | G09G 3/3233 |
| 2020/0335033 | A1* | 10/2020 | Kim | G09G 3/3611 |
| 2021/0158755 | A1* | 5/2021 | Li | G09G 3/3233 |
| 2021/0272531 | A1* | 9/2021 | Shin | G09G 3/3688 |
| 2023/0129090 | A1* | 4/2023 | Kim | G09G 3/3275<br>345/690 |
| 2024/0194117 | A1* | 6/2024 | Bae | G09G 3/2096 |

* cited by examiner

FREQUENCY VARIABLE DISPLAY DEVICE AND FLICKER COMPENSATION METHOD OF THE SAME

CROSS-REFERENCE TO RELATED APPLICATIONS

This application claims the benefit of the Korean Patent Application No. 10-2023-0197157 filed on Dec. 29, 2023, which is hereby incorporated by reference as if fully set forth herein.

BACKGROUND

Technical Field

The present disclosure relates to a frequency variable display apparatus and a flicker compensation method thereof.

Description of the Related Art

Frequency variable display apparatuses vary a frame frequency of an image displayed on a screen, based on an attribute of video data received from an external video source. Frequency variable display apparatuses support a variable refresh rate (VRR) function which varies a frame frequency within a predetermined frequency range.

When a frame frequency is rapidly changed from a low-speed frame to a high-speed frame or to be opposite thereto by a VRR operation, a flicker phenomenon caused by a recognition luminance deviation may be recognized by a user. To decrease the recognition luminance deviation, luminance algorithm technology which adjusts a data gain with a frame frequency has been known.

However, in a VRR mode, frequency information about a current frame may not be known until the current frame ends. Therefore, conventional luminance algorithm technology determines a data gain of a current frame, based on frequency information about a previous frame.

BRIEF SUMMARY

The present disclosure may provide a frequency variable display apparatus and a flicker compensation method thereof, which may decrease a recognition luminance deviation occurring in a rapid change condition of a frame frequency.

To achieve these technical characteristics and other features and in accordance with the embodiments of the disclosure, as broadly described herein, a frequency variable display apparatus includes a display panel where a plurality of subpixels are provided, an image driving circuit configured to write an input image in the plurality of subpixels in a vertical active period, where a data enable signal swings, of one frame to implement target luminance in the plurality of subpixels, and a flicker compensation circuit configured to cause a leakage current flowing from the plurality of subpixels to signal lines corresponding thereto in a vertical blank period, where the data enable signal does not swing, of the one frame to implement flicker compensation luminance which is lower than the target luminance in the plurality of subpixels.

In another aspect of the present disclosure, a flicker compensation method of a frequency variable display apparatus, including a display panel where a plurality of subpixels are provided, includes writing an input image in the plurality of subpixels in a vertical active period, where a data enable signal swings, of one frame to implement target luminance in the plurality of subpixels and causing a leakage current flowing from the plurality of subpixels to signal lines corresponding thereto in a vertical blank period, where the data enable signal does not swing, of the one frame to implement flicker compensation luminance which is lower than the target luminance in the plurality of subpixels.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
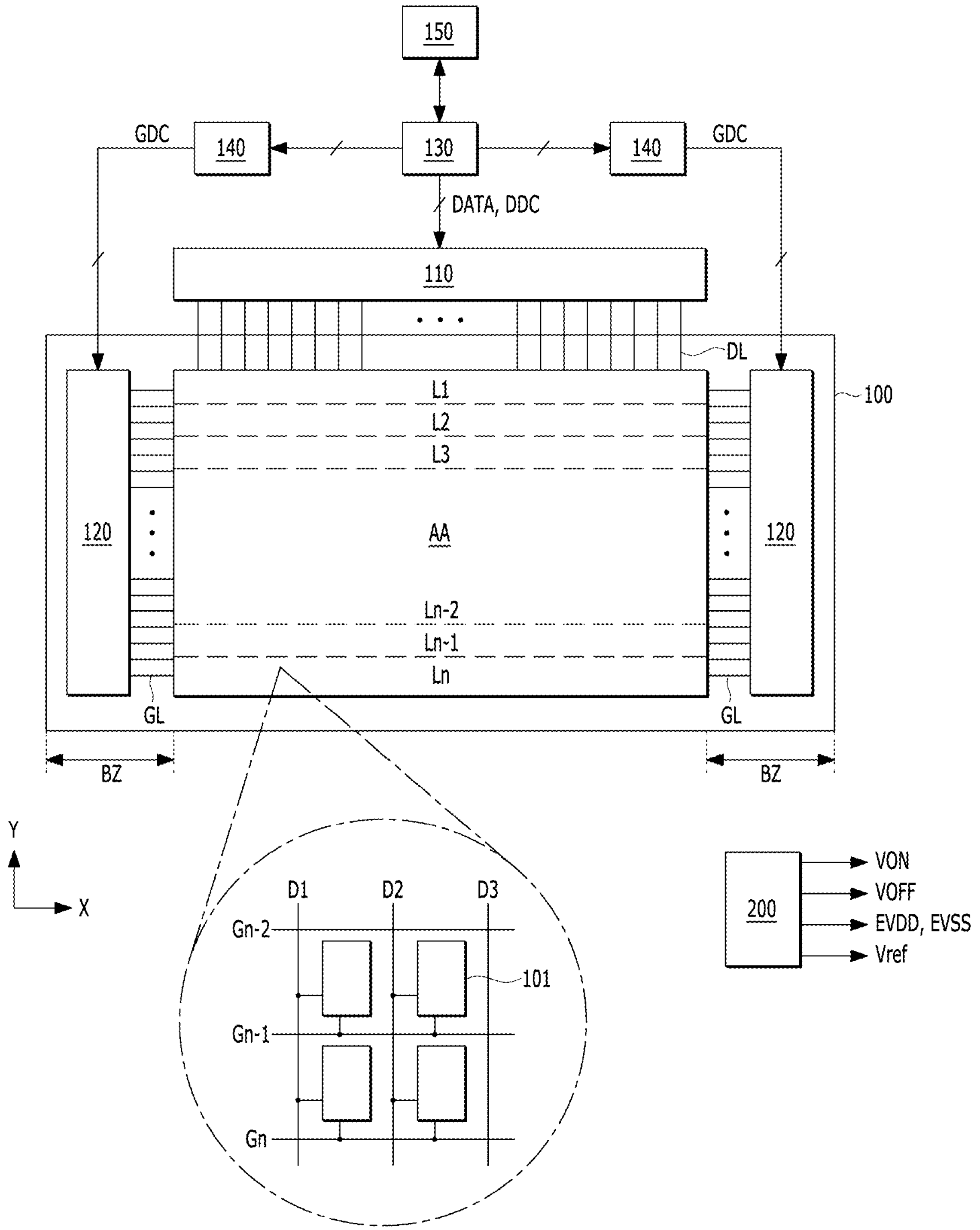
FIG. 1 is a block diagram illustrating a frequency variable display apparatus according to the present embodiment.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms “comprise”, “having,” “including” and the like suggest that other parts can be added unless the term “only” is used. As used herein, the singular forms “a”, “an”, and “the” are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as “on~”, “over~”, “under~”, and “next~”, one or more other parts may be disposed between the two parts unless “just” or “direct” is used.

It will be understood that, although the terms “first”, “second”, etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a block diagram illustrating a frequency variable display apparatus according to the present embodiment.

Referring to FIG. 1, a display panel 100 may include a screen AA which displays an input image. The screen AA may include a pixel array which displays pixel data (hereinafter referred to as “image data”) DATA of an input image. The pixel array may include a plurality of data lines DL, a plurality of gate lines GL intersecting with the data lines DL, a plurality of reference voltage lines, and a plurality of pixels.

The pixels may be arranged on the screen AA in a matrix type defined by the data lines DL, the gate lines GL, and the reference voltage lines. The pixels may be arranged as various types, such as a stripe type and a diamond type as well as a matrix type, on the screen AA.

The pixel array may include a plurality of pixel columns and a plurality of pixel lines L1 to Ln intersecting with the pixel columns. Each of the pixel columns may include pixels which are arranged in a Y-axis direction. A pixel line may include pixels which are arranged in an X-axis direction. One vertical period may be one frame period needed for writing image data DATA of one frame in all pixels of the screen. One horizontal period may be a time obtained by dividing one frame period by the number of pixel lines L1 to Ln. One horizontal period may be a time needed for writing the image data DATA of one pixel line, sharing a gate line GL, in pixels of one pixel line.

Each of the pixels may include a red (R) subpixel 101, a green (G) subpixel 101, a blue (B) subpixel 101, and a white (W) subpixel 101 for implementing colors.

The frequency variable display apparatus according to the present embodiment may be implemented as an electroluminescent display apparatus. In this case, a pixel circuit of the frequency variable display apparatus may include a light emitting device, a driving element, one or more switch elements, and a capacitor. The light emitting device may be implemented as an organic light emitting diode (OLED) or an inorganic light emitting diode. A driving current which allows the light emitting device to emit light may be adjusted based on a gate-source voltage of the driving element. Each of the driving element and the switch element may be implemented as a transistor. A semiconductor layer of the transistor may include amorphous silicon or polysilicon. A semiconductor layer of at least some of transistors may include oxide. The pixel circuit may be connected to a data line DL and a gate line GL. In FIG. 1, “D1 to D3” illustrated in a circle may be data lines, and “Gn-2 to Gn” may be gate lines. Also, each of the subpixels 101 may include the same pixel circuit.

Touch sensors may be disposed on the display panel 100. The touch sensors may be arranged as an on-cell or add-on type on the screen AA of the display panel 100, or may be implemented as in-cell type touch sensors embedded in the pixel array. A touch input may be sensed through the touch sensors, or may be sensed through only pixels even without touch sensors.

A source driver 110 may convert the image data DATA, received from a timing controller 130, into gamma compensation voltages by using a digital-to-analog converter (DAC) to generate data voltages. The source driver 110 may supply the data voltages to the data lines DL. The data voltages may be supplied to the data lines DL and may be applied to gate electrodes of the driving elements through the switch elements of the subpixels 101. The source driver 110 may supply a reference voltage lines with a reference voltage received from a power circuit 200. The reference voltage may be supplied to the reference voltage lines and may be applied to a source electrode of the driving element through a switch element of each subpixel 101.

The source driver 110 may be implemented with one or more source drive integrated circuits (ICs). The source drive IC may be connected to the timing controller 130 through an internal interface circuit. The internal interface circuit may be implemented as an embedded clock point to point interface (EPI). The source drive IC may further include a touch driver. The touch driver may generate a touch sensor driving signal and may convert an electric charge variation of a touch sensor into touch raw data. The touch driver may transfer the touch raw data to a host system (not shown) through a separate interface circuit. The separate interface circuit may be implemented as a serial peripheral interface (SPI).

A gate driver 120 may be provided in a bezel region BZ which is outside a screen and does not display an image on the display panel 100. The gate driver 120 may sequentially supply a gate signal, synchronized with data voltages, to the gate lines GL according to control by the timing controller 130. The gate signal may simultaneously activate a pixel line into which a data voltage is charged. The gate driver 120 may output the gate signal by using one or more shift registers and may shift the gate signal. The gate signal may include one or more scan signals and an emission control signal. The gate signal (or scan signal) may include a gate on voltage VON and a gate off voltage VOFF, received from the power circuit 200, and a 3-level scan signal based on a gate-off control voltage received from the flicker compensation circuit 150.

The timing controller 130 may receive video data DATA and a timing signal, synchronized with the video data DATA, from the host system (not shown). The timing signal may include a vertical synchronization signal Vsync, a horizontal synchronization signal Hsync, a clock signal DCLK, and a data enable signal DE. The vertical synchronization signal Vsync may define a vertical period (i.e., one frame). The horizontal synchronization signal Hsync may define a horizontal period. The data enable signal DE may define a time (i.e., a vertical active period) where the video data DATA is transferred in a vertical period. The other time, except the vertical active period, of the vertical period may be a vertical blank period. The data enable signal DE may swing in the vertical active period and may not swing in the vertical blank period.

The timing controller 130 may generate a source timing control signal DDC for controlling an operation timing of the source driver 110 and a gate timing control signal GDC for controlling an operation timing of the gate driver 120, based on the timing signal Vsync, Hsync, and DE received from the host system.

The host system be one of a television (TV), a set-top box, a navigation system, a personal computer (PC), a home theater, an automotive display system, a mobile device, and a wearable device. In the mobile device and the wearable device, the source driver 110, the timing controller 130, and a level shifter 140 may be integrated into one drive IC.

The level shifter 140 may shift a logic voltage level of the gate timing control signal GDC, output from the timing controller 130, to the gate on voltage VON or the gate off voltage VOFF to supply to the gate driver 120. A low logic voltage of the gate timing control signal GDC may be shifted to the gate off voltage VOFF, and a high logic voltage of the gate timing control signal GDC may be shifted to the gate on voltage VON.

The source driver 110 and the gate driver 120 may configure an image driving circuit. The image driving circuit may write an input image in the subpixels 101 in a vertical active period of one frame to implement target luminance in the subpixels 101.

The flicker compensation circuit 150 may cause a leakage current flowing from the subpixels 101 to signal lines (i.e., data lines and reference voltage lines) corresponding thereto in a vertical blank period of the one frame to implement flicker compensation luminance which is lower than the target luminance in the subpixels 101. When a frame frequency varies, a length of the vertical active period may be fixed, but a length of the vertical blank period may be changed. The flicker compensation circuit 150 may cause a leakage current in the vertical blank period to reduce luminance implemented in the subpixels 101, and thus, may decrease a recognition luminance deviation between frames occurring in a rapid change condition of the frame frequency.

The flicker compensation circuit 150 may cause a leakage current in the vertical blank period to output a gate-off control voltage between the gate on voltage VON and the gate off voltage VOFF to the gate driver 120. Accordingly, the gate on voltage VON, the gate off voltage VOFF, and the 3-level scan signal based on a gate-off control voltage may be generated from the gate driver 120. The flicker compensation circuit 150 may adjust a level of the gate-off control voltage, based on a change in length of the vertical blank period.

The flicker compensation circuit 150 may further output a first fixed voltage to the data lines DL and may further output a second fixed voltage to the reference voltage lines, so as to decrease luminance implemented through subpixels in the vertical blank period. A gate-source voltage of the driving element may be relatively reduced by the first fixed voltage in the vertical blank period, and thus, a current flowing in the driving element may decrease. Based on the second fixed voltage, a leakage current flowing to the reference voltage line may increase, and thus, a current flowing in the light emitting device may be reduced.

The flicker compensation circuit 150 may be integrated into the power circuit 200.

The power circuit 200 may generate various source voltages needed for panel driving. The power circuit 200 may generate the gate on voltage VON and the gate off voltage VOFF needed for generating of the scan signal, generate a high level source voltage EVDD and a low level source voltage EVSS which are to be supplied to each subpixel 101, and generate the reference voltage Vref which is to be supplied to a reference voltage line.

Figure 2:
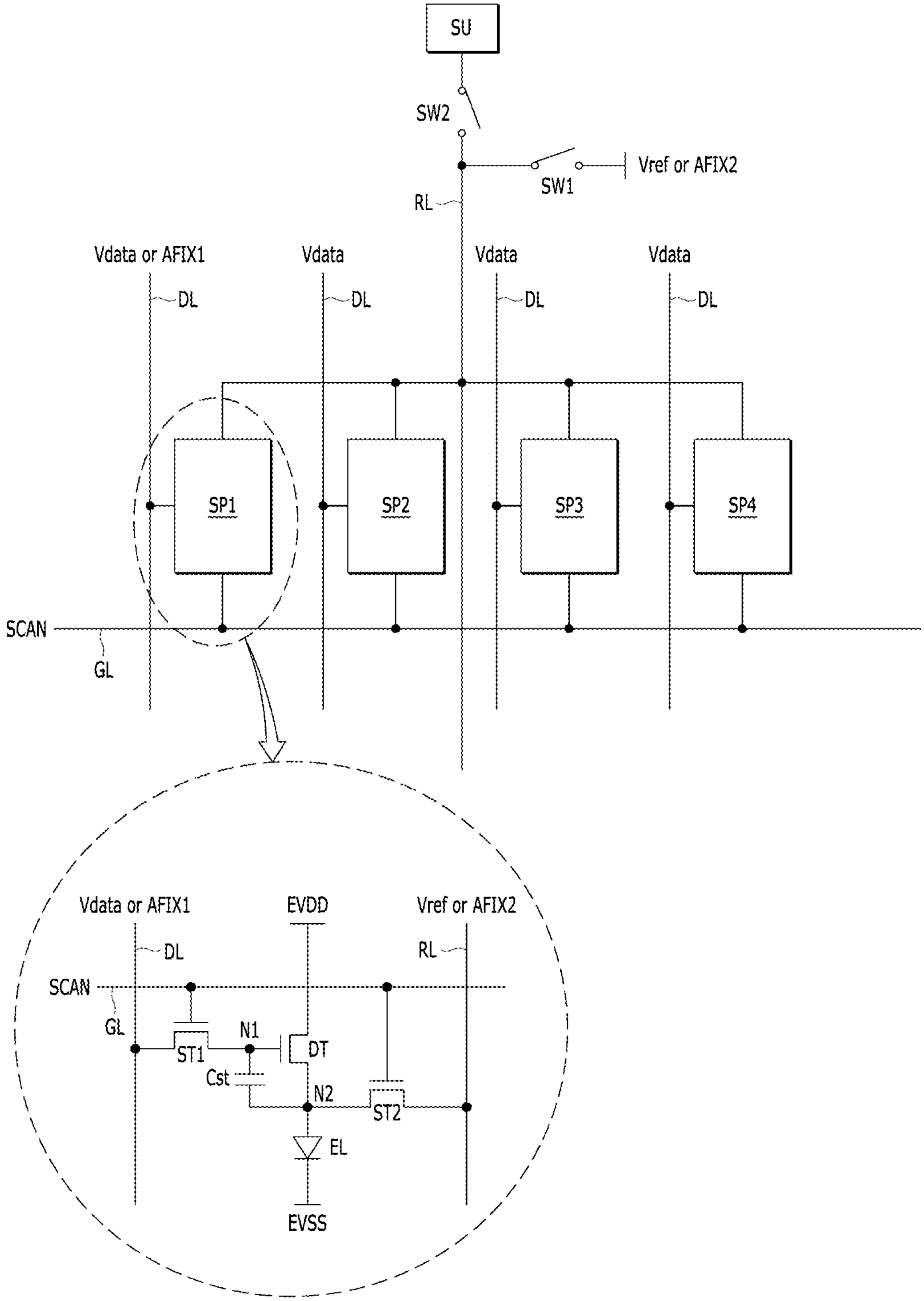
FIG. 2 is a diagram illustrating a connection configuration of one pixel according to the present embodiment.

FIG. 2 is a diagram illustrating a connection configuration of one pixel PXL according to the present embodiment.

Referring to FIG. 2, the one pixel PXL may include a plurality of subpixel, e.g., four subpixels SP1 to SP4, which share a reference voltage line RL. The four subpixels SP1 to SP4 may be R, G, B, and W subpixels for configuring the same pixel. Each of the subpixels SP1 to SP4 may include, for example, a light emitting device EL, a driving transistor DT, a storage capacitor Cst, a first switch transistor ST1, and a second switch transistor ST2.

The light emitting device EL may emit light with a driving current supplied from the driving transistor DT to implement luminance. An anode electrode of the light emitting device EL may be connected to a second node N2, and a cathode electrode thereof may be connected to an input terminal of a low level source voltage EVSS. In the same frame, the amount of current flowing in the light emitting device EL may be more reduced in a vertical blank period than a vertical active period. This may be caused by a leakage current occurring in the vertical blank period.

The driving transistor DT may generate the driving current based on the gate-source voltage thereof to supply to the light emitting device EL. A gate electrode of the driving transistor DT may be connected to a first node N1, a drain electrode thereof may be connected to an input terminal of a high level source voltage EVDD, and a source electrode thereof may be connected to the second node N2. In the same frame, the gate-source voltage of the driving transistor DT may be more reduced in the vertical blank period than the vertical active period. This may be caused by a leakage current occurring in the vertical blank period.

A gate electrode of the first switch transistor ST1 may be connected to a gate line GL. A first electrode of the first switch transistor ST1 may be connected to the data line DL, and a second electrode thereof may be connected to the first node N1.

A gate electrode of the second switch transistor ST2 may be connected to the gate line GL. A first electrode of the second switch transistor ST2 may be connected to the reference voltage line RL, and a second electrode thereof may be connected to the second node N2.

A first electrode of the storage capacitor Cst may be connected to the first node N1, and a second electrode thereof may be connected to the second node N2.

The first and second switch transistors ST1 and ST2 may be turned on based on a scan signal SCAN of a gate on voltage in the vertical active period, and thus, may connect the gate electrode of the driving transistor DT to the data line DL and may connect the source electrode of the driving transistor DT to the reference voltage line RL. Accordingly, a display programming operation for writing image data may be performed. When the display programming operation is completed in the vertical active period, the first and second switch transistors ST1 and ST2 may be turned off based on a scan signal SCAN of a gate off voltage.

The first and second switch transistors ST1 and ST2 may be turned on based on the scan signal SCAN of the gate on voltage in a vertical back porch VBP (see FIG. 3) of the vertical blank period, and thus, may connect the gate electrode of the driving transistor DT to the data line DL and may connect the source electrode of the driving transistor DT to the reference voltage line RL. Accordingly, a sensing programming operation for writing sensing data may be performed. When the sensing programming operation is completed in the vertical back porch VBP, the first and second switch transistors ST1 and ST2 may be turned off based on the scan signal SCAN of the gate off voltage.

The first and second switch transistors ST1 and ST2 may be slightly turned on, e.g., by a gate voltage smaller than the threshold voltage but sufficient to cause leakage, based on the scan signal SCAN of a gate-off control voltage in a vertical front porch VFP (see FIG. 3) of the vertical blank period, and thus, may cause a leakage current between the gate electrode of the driving transistor DT and the data line DL and may cause a leakage current between the source electrode of the driving transistor DT and the reference voltage line RL. Accordingly, a flicker compensation operation for decreasing a recognition luminance deviation occurring in a rapid change condition of a frame frequency may be performed.

Furthermore, in the vertical front porch VFP (see FIG. 3), a first fixed voltage AFIX1 may be applied to the data line DL, and a second fixed voltage AFIX2 may be applied to the reference voltage line RL, so as to effectively decrease luminance. In FIG. 2, "Vdata" may be a data voltage corresponding to image data or sensing data, and "Vref" may be a reference voltage for the display programming operation and the sensing programming operation. The first fixed voltage AFIX1 may be lower than a data voltage Vdata which is charged into the first node N1 of the subpixel in the vertical active period. Also, the second fixed voltage AFIX2 may be lower than a reference voltage Vref which is charged into the second node N2 of the subpixel in the vertical active period.

A first switch SW1 and a second switch SW2 may be further connected to the reference voltage line RL. The first switch SW1 may connect an output terminal of the reference voltage Vref or an output terminal of the second fixed voltage AFIX2 to the reference voltage line RL. The second switch SW2 may connect a sensing circuit SU to the reference voltage line RL.

The first switch SW1 and the second switch SW2 may operate to be opposite to each other. That is, an electrical connection between the second switch SW2 and the reference voltage line RL may be turned off while the first switch SW1 is being connected to the reference voltage line RL. On the other hand, an electrical connection between the first switch SW1 and the reference voltage line RL may be broken while the second switch SW2 is being connected to the reference voltage line RL.

A sensing operation of the sensing circuit SU may be enabled while the second switch SW2 is being connected to the reference voltage line RL. The sensing operation of the sensing circuit SU may be performed after the sensing programming operation is completed in the vertical back porch, and thus, an electrical characteristic change (for example, a threshold voltage variation and an electron mobility change of the driving transistor) of each subpixel may be sensed.

Figure 3:
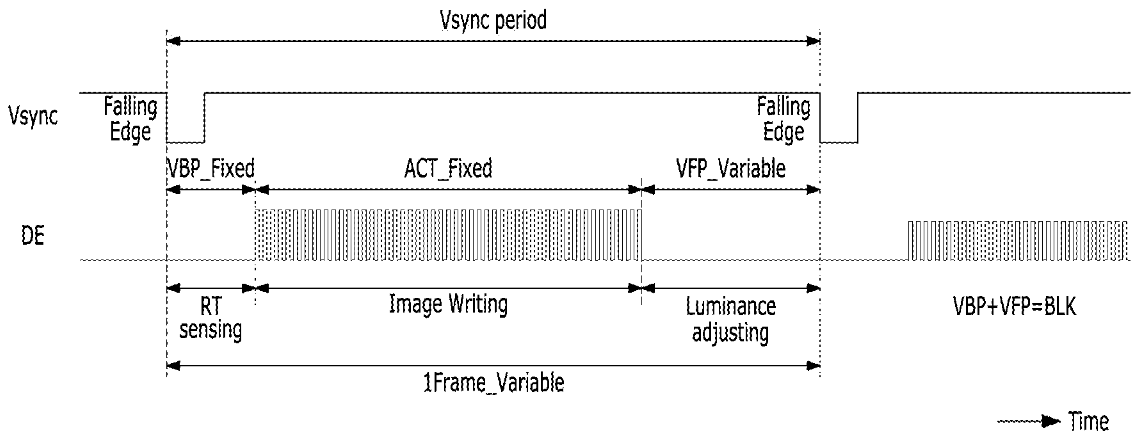
FIG. 3 is a diagram illustrating a vertical active period and a vertical blank period configuring one frame time.
Figure 4:
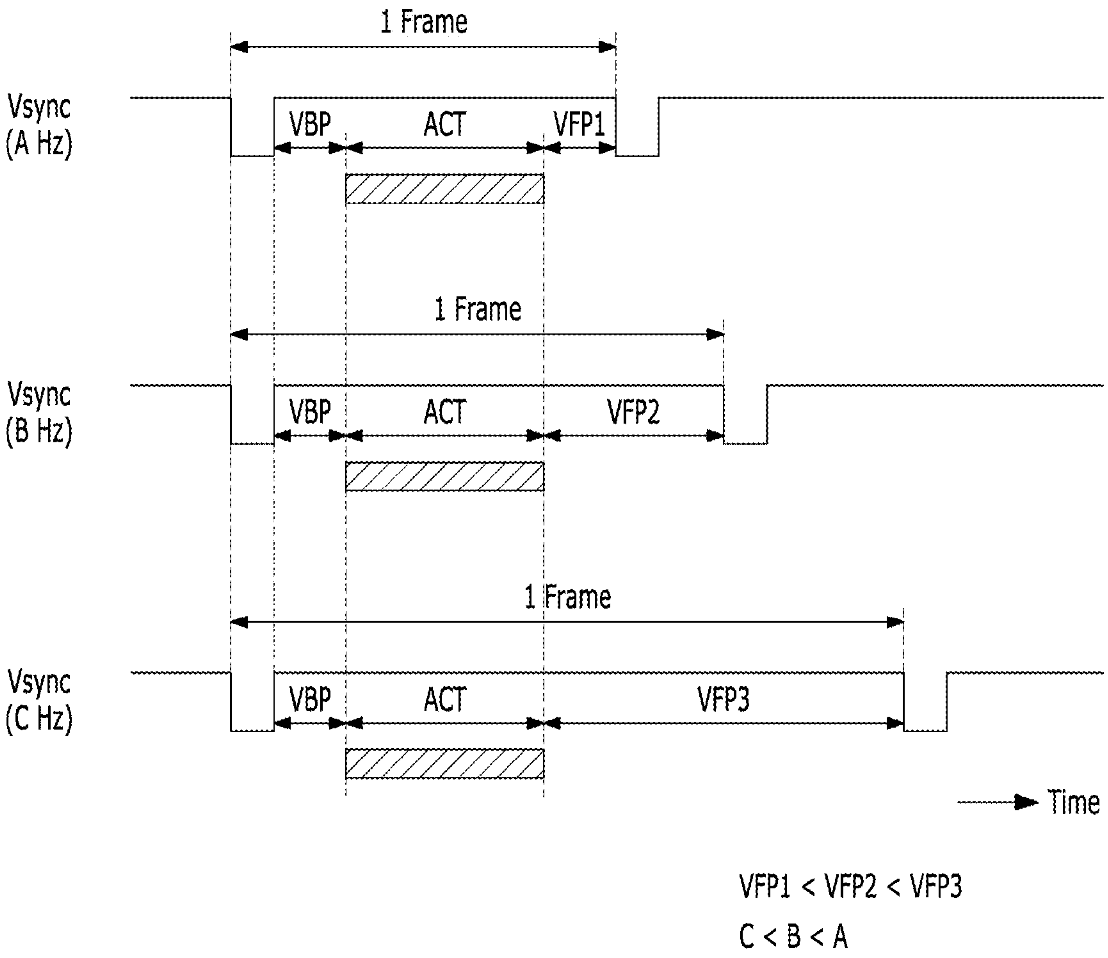
FIG. 4 is a diagram illustrating an example where a length of a vertical front porch included in a vertical blank period varies based on a level of a frame frequency.

FIG. 3 is a diagram illustrating a vertical active period (including and a vertical blank period BLK (including a vertical back porch VBP and a vertical front porch VFP) included in one frame time. FIG. 4 is a diagram illustrating an example where a length of a vertical front porch included in a vertical blank period varies based on a level of a frame frequency.

Referring to FIG. 3, one frame time (vertical period) may be defined by a vertical synchronization signal Vsync. The one frame time (vertical period) may be defined as a time interval between adjacent falling edges (or rising edges) of the vertical synchronization signal Vsync.

A vertical active period ACT and a vertical blank period BLK in the one frame time (vertical period) may be defined by a data enable signal DE. The vertical active period ACT may be a period where the data enable signal DE swings, and the vertical blank period BLK may be a period where the data enable signal DE does not swing.

Vertical blank periods BLK may be divisionally arranged with the vertical active period ACT therebetween in the one frame. The vertical blank period BLK may include a vertical back porch VBP arranged previously to the vertical active period ACT and a vertical front porch VFP arranged next to the vertical active period ACT.

The frequency variable display apparatus according to the present embodiment may have a VRR mode where a length of one frame varies. In the VRR mode, as in FIG. 4, a frame frequency may be changed to A, B, and C Hz. When the frame frequency is changed, one frame time may be changed to correspond thereto. At this time, each of a length of the vertical back porch VBP and a length of the vertical active period ACT may be fixed to a predetermined constant value, and only a length of the vertical front porch VFP may be changed. A length of the vertical front porch VFP may be VFP1, based on a frame frequency of A Hz, a length of the vertical front porch VFP may be VFP2, based on a frame frequency of B Hz, and a length of the vertical front porch VFP may be VFP3, based on a frame frequency of C Hz. Here, when A>B>C, VFP1<VFP2<VFP3.

In a vertical active period ACT having a fixed length, a display programming operation for writing an image may be performed.

In a vertical front porch VFP having a variable length, a flicker compensation operation for reducing luminance may be performed. The flicker compensation operation may be performed so that the amount of reduction of luminance increases as a length of the vertical front porch VFP increases.

The sensing programming operation and the sensing operation described above may be performed in the vertical back porch VBP having a fixed length. In the VRR mode, because a real-time (RT) sensing operation is performed in the vertical back porch VBP having the fixed length, a sensing line compensation algorithm may be applied in real time without an error. The sensing line compensation algorithm may be technology which differentially applies a compensation gain for luminance restoration, based on a position of a pixel line where a sensing operation is performed, and thus, increases image quality. For example, when the sensing operation is performed in a blank period where a length is changed based on a frame frequency, it may be difficult to apply the sensing line compensation algorithm in real time. This may be because a length of a blank period should be more reflected in a compensation gain, but the length of the blank period may not be known until the blank period ends. That is, this may be because the length of the blank period may not be known at a time at which the sensing line compensation algorithm is executed.

Figure 5:
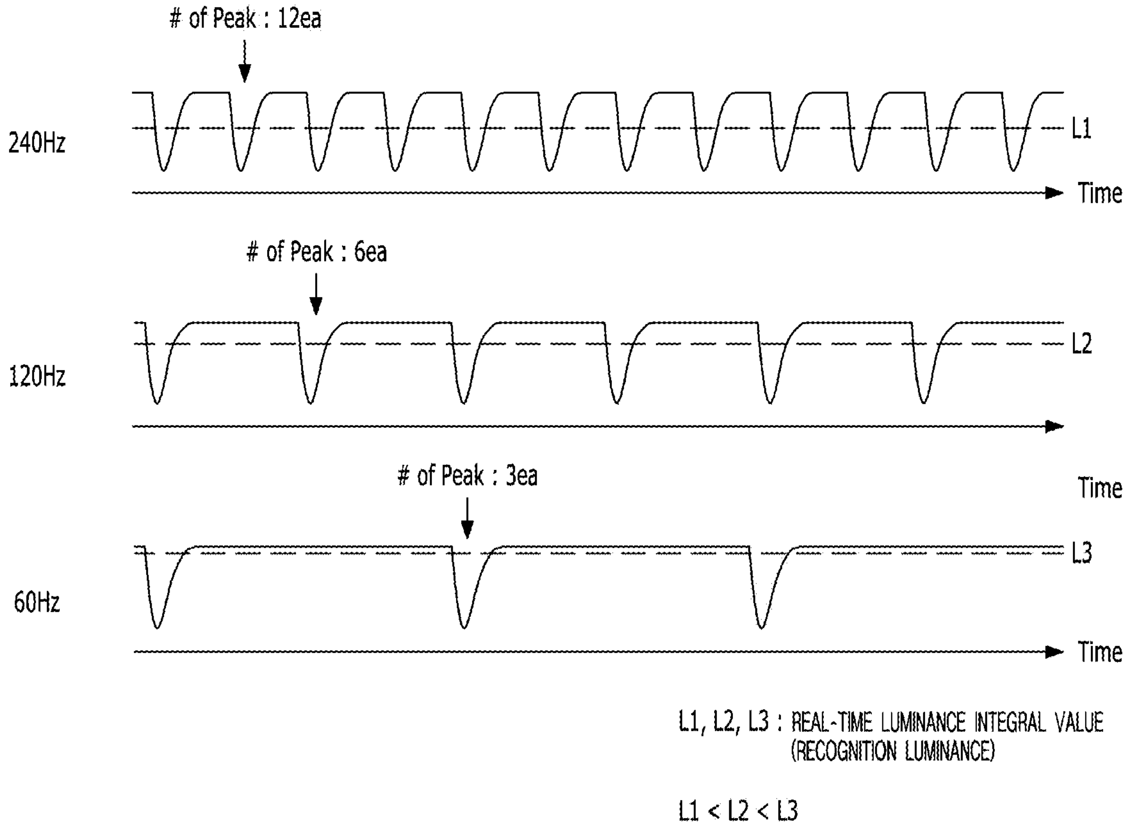
FIG. 5 is a diagram illustrating an example where recognition luminance is changed based on a level of a frame frequency.
Figure 6:
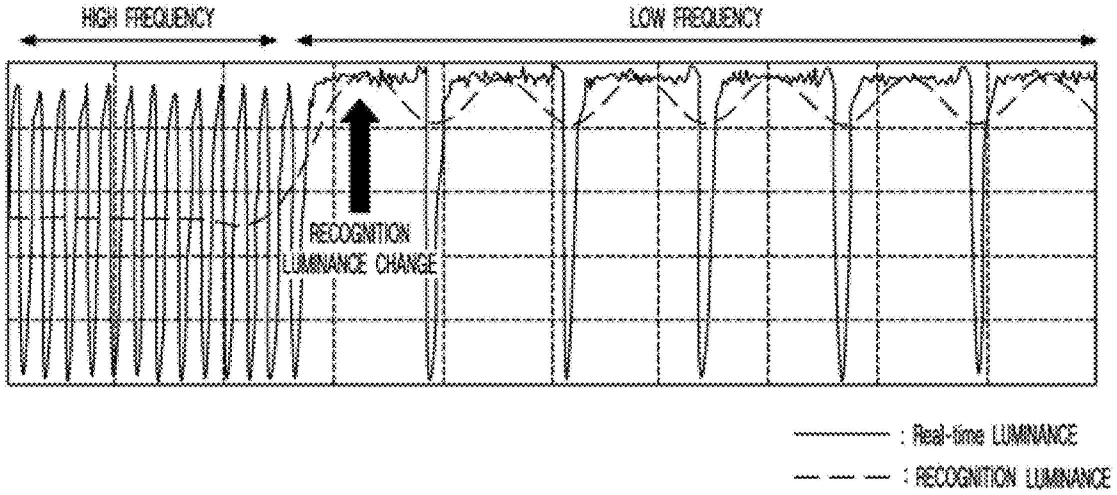
FIG. 6 is a diagram illustrating a recognition luminance deviation occurring in a rapid change condition of a frame frequency.
Figure 7:
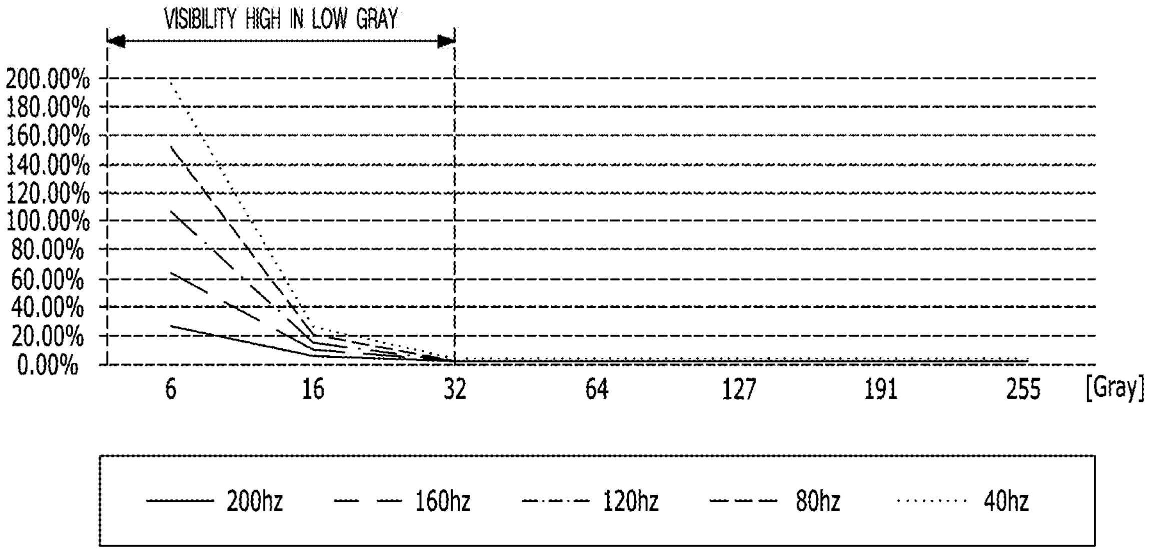
FIGS. 7 and 8 are diagrams illustrating an example where the visibility of a recognition luminance deviation occurring in a rapid change condition of a frame frequency is higher in a high gray level than a low gray level.
Figure 8:
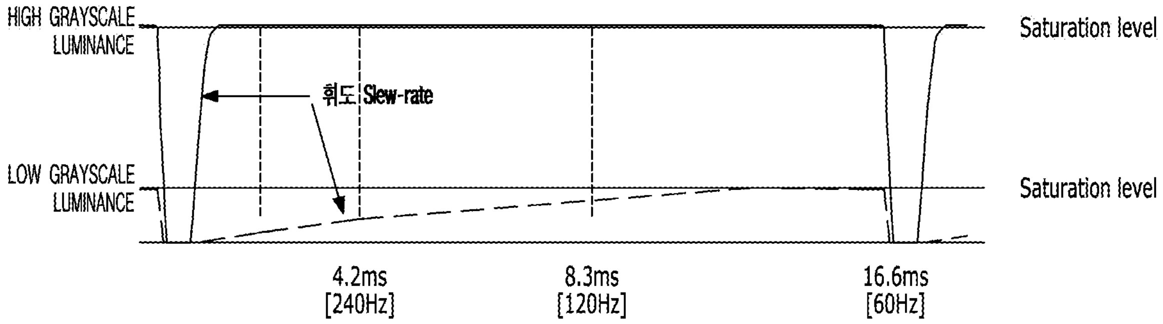

FIG. 5 is a diagram illustrating an example where recognition luminance is changed based on a level of a frame frequency. FIG. 6 is a diagram illustrating a recognition luminance deviation occurring in a rapid change condition of a frame frequency. FIGS. 7 and 8 are diagrams illustrating an example where the visibility of a recognition luminance deviation occurring in a rapid change condition of a frame frequency is higher in a high gray level than a low gray level.

Peak low points of FIGS. 5 and 6 may be points at which a display programming operation is performed. An emission operation may be performed after the display programming operation is performed. The emission operation may stop while the display programming operation is being performed.

The display programming operation and the emission operation may be successively performed in one frame. The number of display programming operations may increase as the number of frame arrangements in a predetermined time increases, namely, a frame frequency increases, and thus, recognition luminance may be reduced. For example, the number of display programming operations in a predetermined time in a frame frequency of 240 Hz may be twelve, the number of display programming operations in a predetermined time in a frame frequency of 120 Hz may be six, and the number of display programming operations in a predetermined time in a frame frequency of 60 Hz may be three. As a result, a real-time luminance integral value (i.e., recognition luminance) of a frame frequency of 240 Hz may be L1, a real-time luminance integral value (i.e., recognition luminance) of a frame frequency of 120 Hz may be L2 which is higher than L1, and a real-time luminance integral value (i.e., recognition luminance) of a frame frequency of 60 Hz may be L3 which is higher than L2.

As described above, when it is assumed that a gray level of a display image is constant, recognition luminance may be relatively higher in a case, where a frame frequency is a low frequency, than a case where the frame frequency is a high frequency. Accordingly, a luminance deviation caused by a change in recognition luminance may occur when the frame frequency is changed from a high frequency to a low frequency.

A frequency-based luminance deviation, as in FIGS. 7 and 8, may be relatively higher recognized in a low grayscale period than a high grayscale period. In a case where a time taken until reaching an active luminance saturation level immediately after programming is defined as a luminance slew rate, a luminance slew rate of a high grayscale image may be relatively higher than a luminance slew rate of a low grayscale image. Accordingly, a recognition luminance deviation caused by a change in frequency may not be largely issued in a high grayscale image, but may be clearly recognized when displaying a low grayscale image.

Figure 9:
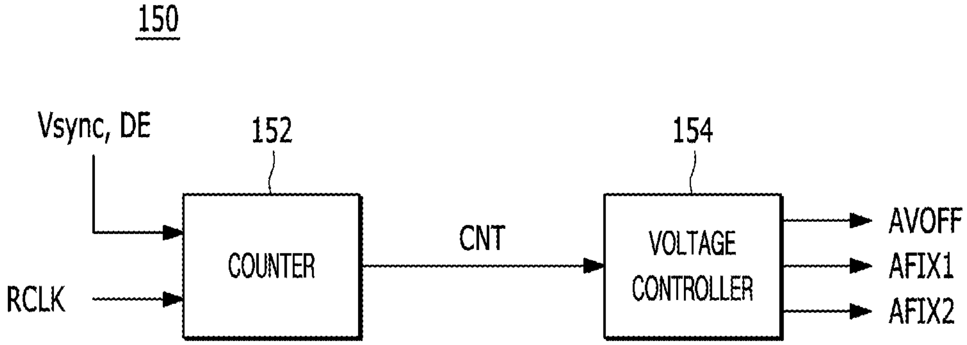
FIG. 9 is a diagram illustrating a configuration of a flicker compensation circuit according to the present embodiment.
Figure 10:
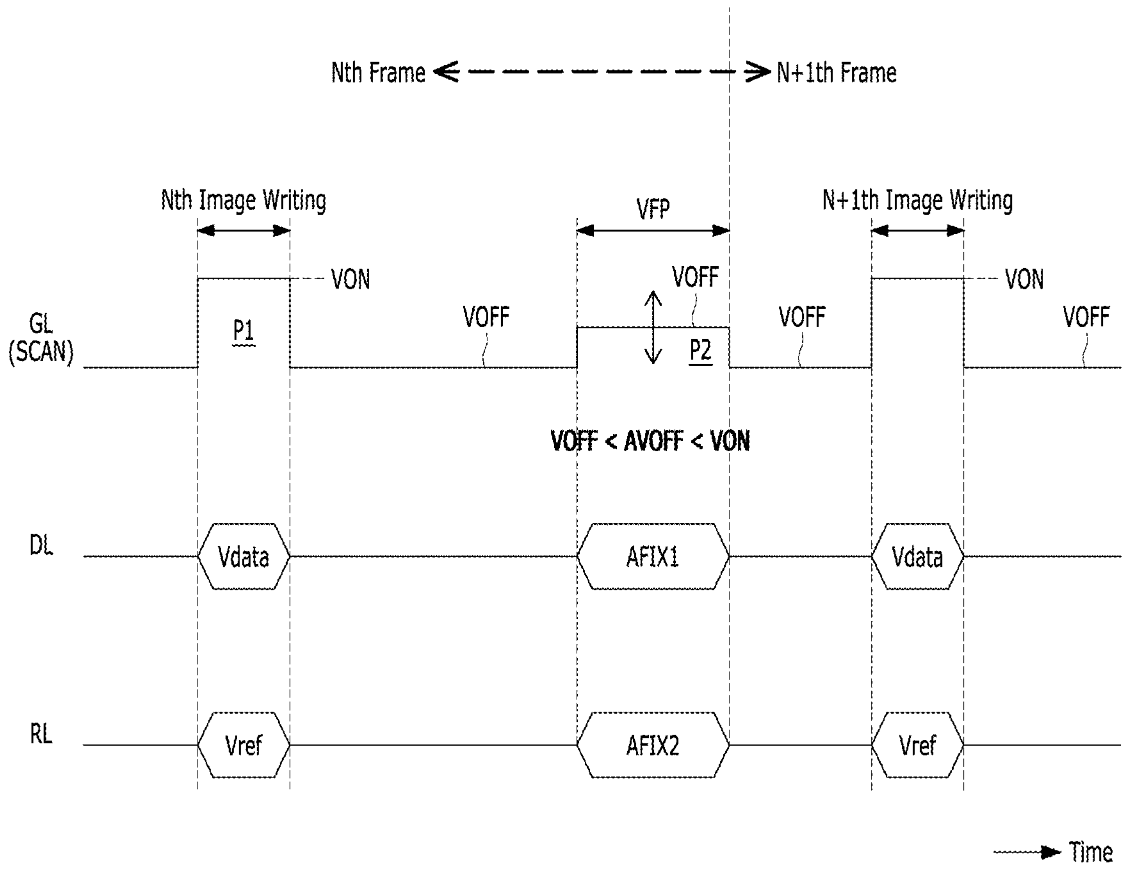
FIGS. 10 and 11 are driving timing diagrams for describing a luminance control operation of a flicker compensation circuit.
Figure 11:
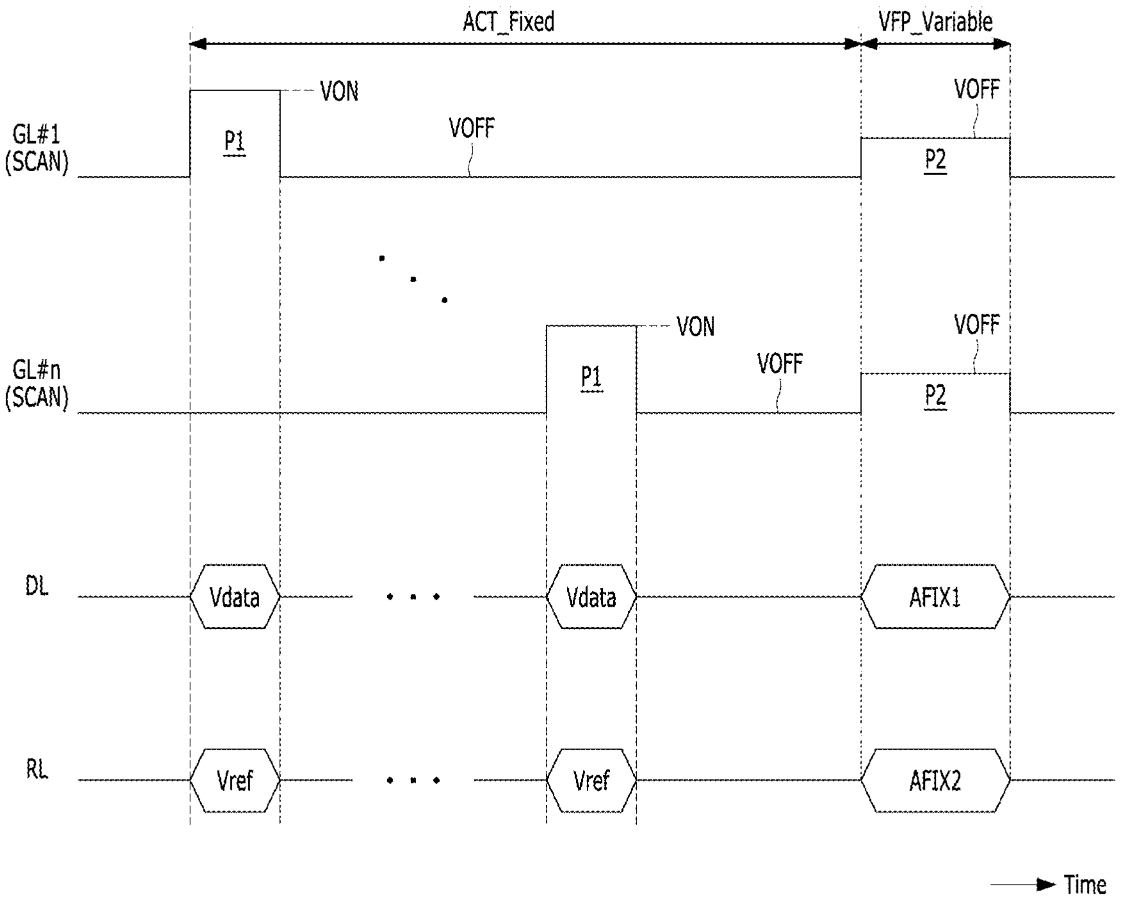
Figure 12:
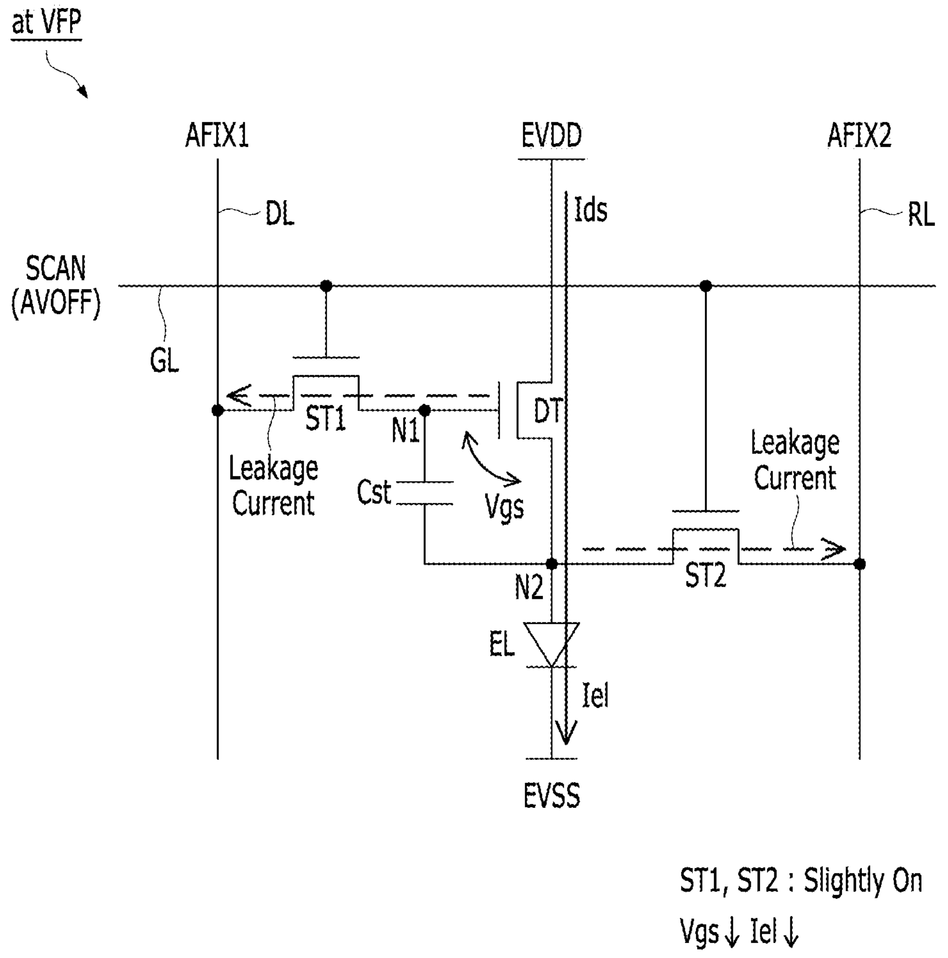
FIG. 12 is a diagram for describing an operation of one subpixel in a vertical front porch according to the present embodiment.
Figure 13:
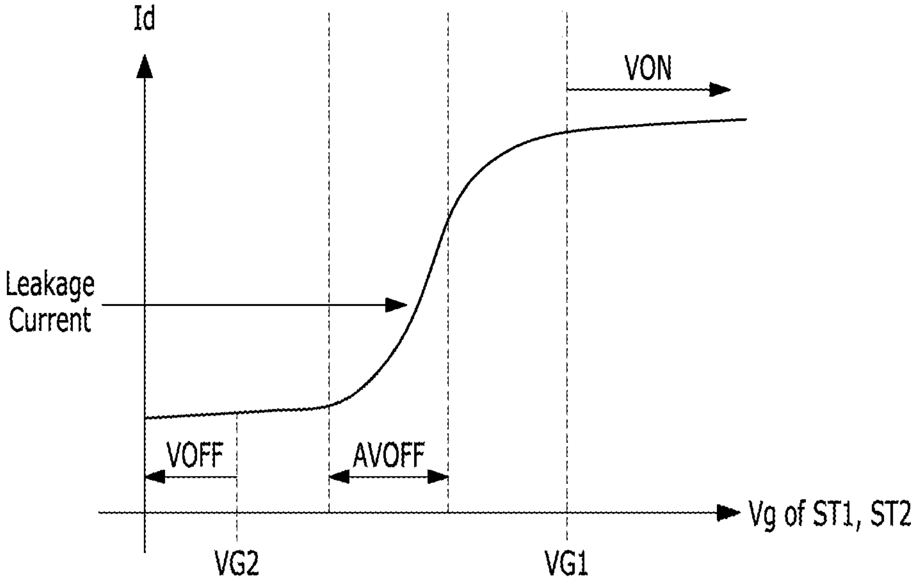
FIG. 13 is a diagram illustrating a setting range of a gate-off control voltage for allowing a leakage current to flow in switch transistors of a subpixel in a vertical front porch.

FIG. 9 is a diagram illustrating a configuration of a flicker compensation circuit 150 according to the present embodiment. FIGS. 10 and 11 are driving timing diagrams for describing a luminance control operation of the flicker compensation circuit 150. FIG. 12 is a diagram for describing an operation of one subpixel in a vertical front porch according to the present embodiment. FIG. 13 is a diagram illustrating a setting range of a gate-off control voltage for allowing a leakage current to flow in switch transistors of a subpixel in a vertical front porch.

Referring to FIGS. 9 to 13, the flicker compensation circuit 150 according to the present embodiment may cause a leakage current flowing from subpixels to signal lines corresponding thereto in a vertical front porch VFP to implement flicker compensation luminance which is lower than target luminance in the subpixels.

The flicker compensation circuit 150 may output a gate-off control voltage AVOFF, so as to cause the leakage current flowing from the subpixels to the signal lines corresponding thereto in the vertical front porch VFP. The gate-off control voltage AVOFF may configure a 3-level scan signal SCAN along with a gate on voltage VON and a gate off voltage VOFF. The gate-off control voltage AVOFF may be set to be lower than the gate on voltage VON and higher than the gate off voltage VOFF. In a case where the gate on voltage VON is set to a voltage of VG1 or more in a Vg-Id curve graph of FIG. 13 and the gate off voltage VOFF is set to a voltage of VG2 or less in the Vg-Id curve graph of FIG. 13, the gate-off control voltage AVOFF may be set in a certain voltage period between VG1 and VG2. Accordingly, first and second switch transistors ST1 and ST2 of each subpixel may be slightly turned on in the vertical front porch VFP. That is, in the vertical front porch VFP, a leakage current path may be formed through the first and second switch transistors ST1 and ST2.

The flicker compensation circuit 150 may increase a level of the gate-off control voltage AVOFF in proportion to a length of the vertical front porch VFP. As a level of the gate-off control voltage AVOFF increases, a leakage current flowing through the first and second switch transistors ST1 and ST2 may increase.

To this end, the flicker compensation circuit 150 may include a counter 152 and a voltage controller 154.

A length of the vertical front porch VFP defined by a vertical synchronization signal Vsync and a data enable signal DE may vary based on a frame frequency. The counter 152 may count a length of the vertical front porch VFP with a reference clock RCLK to continuously supply a real-time count value CNT to the voltage controller 154.

The voltage controller 154 may progressively increase a level of the gate-off control voltage AVOFF, based on the real-time count value CNT corresponding to a length of the vertical front porch VFP. That is, a level of the gate-off control voltage AVOFF may increase up to a target value in the vertical front porch VFP.

The voltage controller 154 may further output the first fixed voltage AFIX1 to the data lines DL during the vertical front porch VFP and may further output the second fixed voltage AFIX2 to the reference voltage lines RL during the vertical front porch VFP, so as to implement flicker compensation luminance in subpixels during the vertical front porch VFP.

The first fixed voltage AFIX1 may be lower than a data voltage Vdata charged into gate nodes N1 of the subpixels in a vertical active period ACT. As a potential difference between the first fixed voltage AFIX1 and the data voltage Vdata increases, a gate potential (an electric potential of N1) of a driving transistor DT may be quickly discharged up to the first fixed voltage AFIX1 from the data voltage Vdata. As a result, in the vertical front porch VFP, a gate-source voltage Vgs of the driving transistor DT may relatively decrease, and thus, a driving current Ids flowing between a drain and a source of the driving transistor DT may be reduced.

The second fixed voltage AFIX2 may be lower than a reference voltage Vref charged into gate nodes N2 of the subpixels in the vertical active period ACT. In the vertical front porch VFP, a source potential (an electric potential of N2) of the driving transistor DT may be maintained as an operation point voltage of the light emitting device EL which is higher than the reference voltage Vref. At this time, when the second fixed voltage AFIX2 is sufficiently lower than the reference voltage Vref, a leakage current flowing to the reference voltage line RL may increase, and thus, a current Iel flowing in the light emitting device EL may decrease.

Referring to FIGS. 10 and 11, the 3-level scan signal SCAN applied to each gate line may include a first pulse P1 corresponding to the vertical active period ACT and a second pulse P2 corresponding to the vertical front porch VFP.

The data voltage Vdata may be applied to the data line DL and the reference voltage Vref may be applied to the reference voltage line RL, in synchronization with a gate on voltage VON of the first pulse P1.

The first fixed voltage AFIX1 may be applied to the data line DL and the second fixed voltage AFIX2 may be applied to the reference voltage line RL, in synchronization with a gate-off control voltage AVOFF of the second pulse P2.

The first pulse P1 may be sequentially applied to all gate lines GL #1 to GL #n in the vertical active period ACT, and the second pulse P2 may be simultaneously applied to all gate lines GL #1 to GL #n in the vertical front porch VFP. In the vertical front porch VFP, the first fixed voltage AFIX1 may be simultaneously applied to all data lines DL and the second fixed voltage AFIX2 may be simultaneously applied to all reference voltage lines RL, in synchronization with the second pulse P2.

Figure 14:
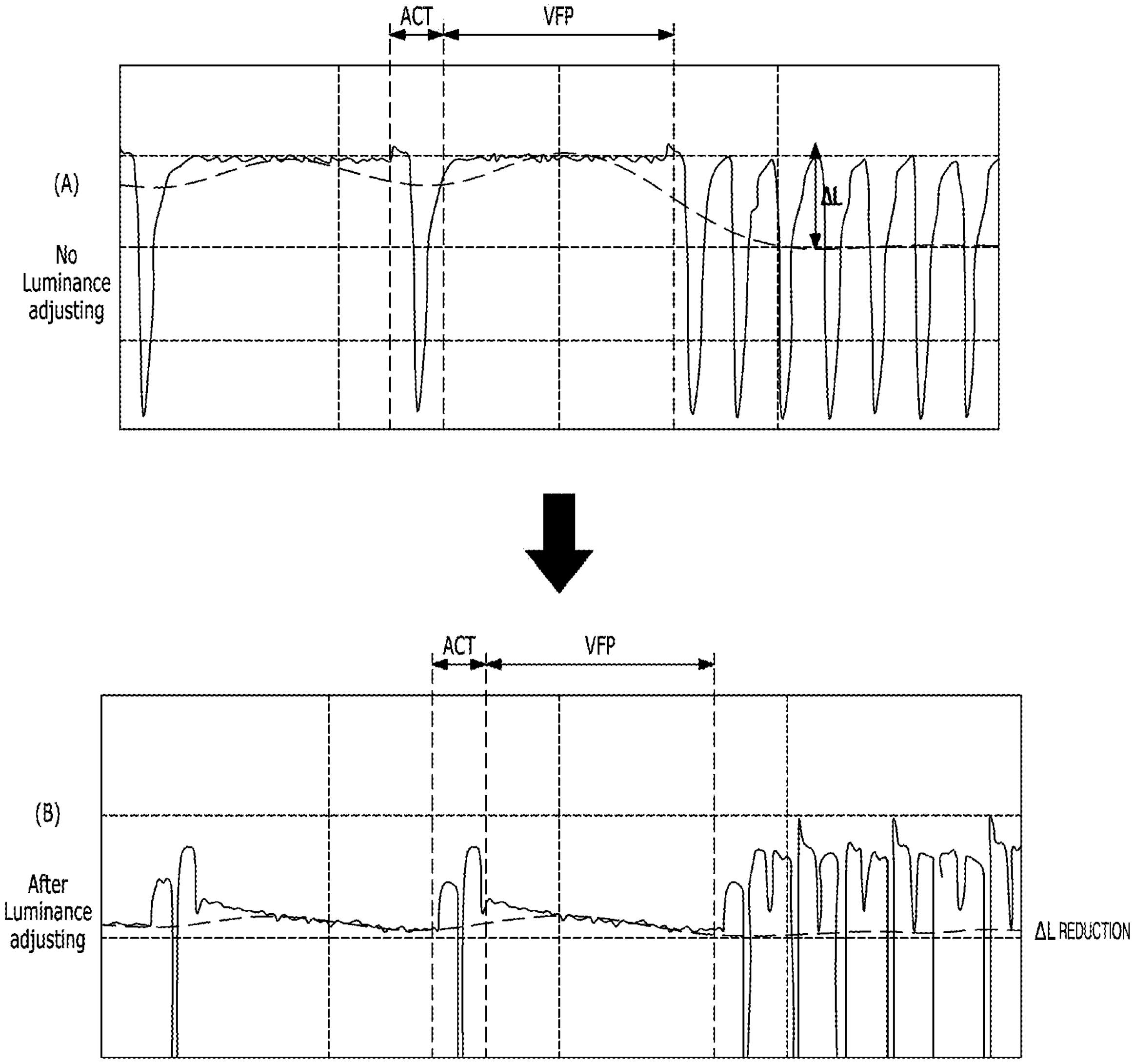
FIG. 14 is a diagram illustrating a relative magnitude of a recognition luminance deviation in a case where a luminance control operation is implemented in a vertical front porch and otherwise.

FIG. 14 is a diagram illustrating a relative magnitude of a recognition luminance deviation in a case where a luminance control operation is implemented in a vertical front porch and otherwise.

Referring to FIG. 14, in a vertical front porch VFP while a VRR operation is being performed, a B case where a luminance control operation is implemented may represent a recognition luminance deviation ΔL which is considerably reduced compared to an A case where the luminance control operation is not implemented.

Figure 15:
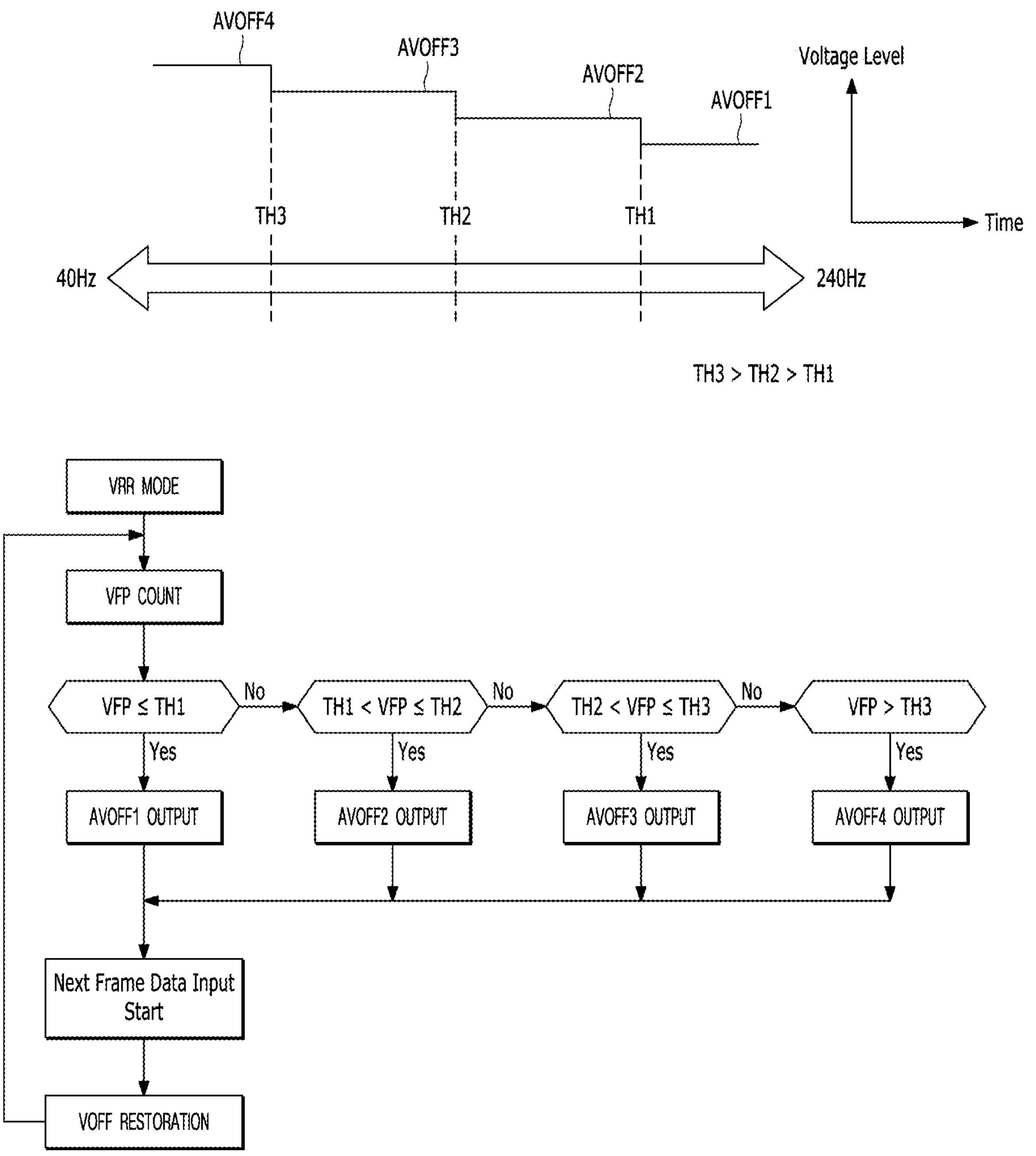
FIG. 15 is a diagram illustrating an example where a level of a gate-off control voltage is step by step adjusted in real time in proportion to a length of a vertical front porch.

FIG. 15 is a diagram illustrating an example where a level of a gate-off control voltage is step by step adjusted in real time in proportion to a length of a vertical front porch.

Referring to FIG. 15, the flicker compensation circuit according to the present embodiment may step by step increase a level of a gate-off control voltage AVOFF in real time in proportion to a length of a vertical front porch VFP.

The flicker compensation circuit may previously store a plurality of count threshold values TH1 to TH3 having different magnitudes, which respectively correspond to a plurality of frame frequencies, and may step by step increase a level of a gate-off control voltage AVOFF up to a target value in real time, based on a sequential comparison operation between the plurality of count threshold values TH1 to TH3 and a real-time count value of a length of the vertical front porch VFP.

That is, during a vertical front porch VFP of a first frame, the flicker compensation circuit may step by step increase a level of the gate-off control voltage AVOFF up to a first target value (for example, AVOFF2) in real time, based on a real-time count value of a first length of the vertical front porch VFP, and during a vertical front porch VFP of a second frame, the flicker compensation circuit may step by step increase a level of the gate-off control voltage AVOFF up to a second target value (for example, AVOFF4) in real time, based on a real-time count value of a second length of the vertical front porch VFP.

In this case, the second length of the vertical front porch VFP may be longer than the first length of the vertical front porch VFP, and the second target value of the gate-off control voltage AVOFF may be greater than the first target value of the gate-off control voltage AVOFF. Accordingly, a leakage current may more increase in the second frame than the first frame.

Figure 16:
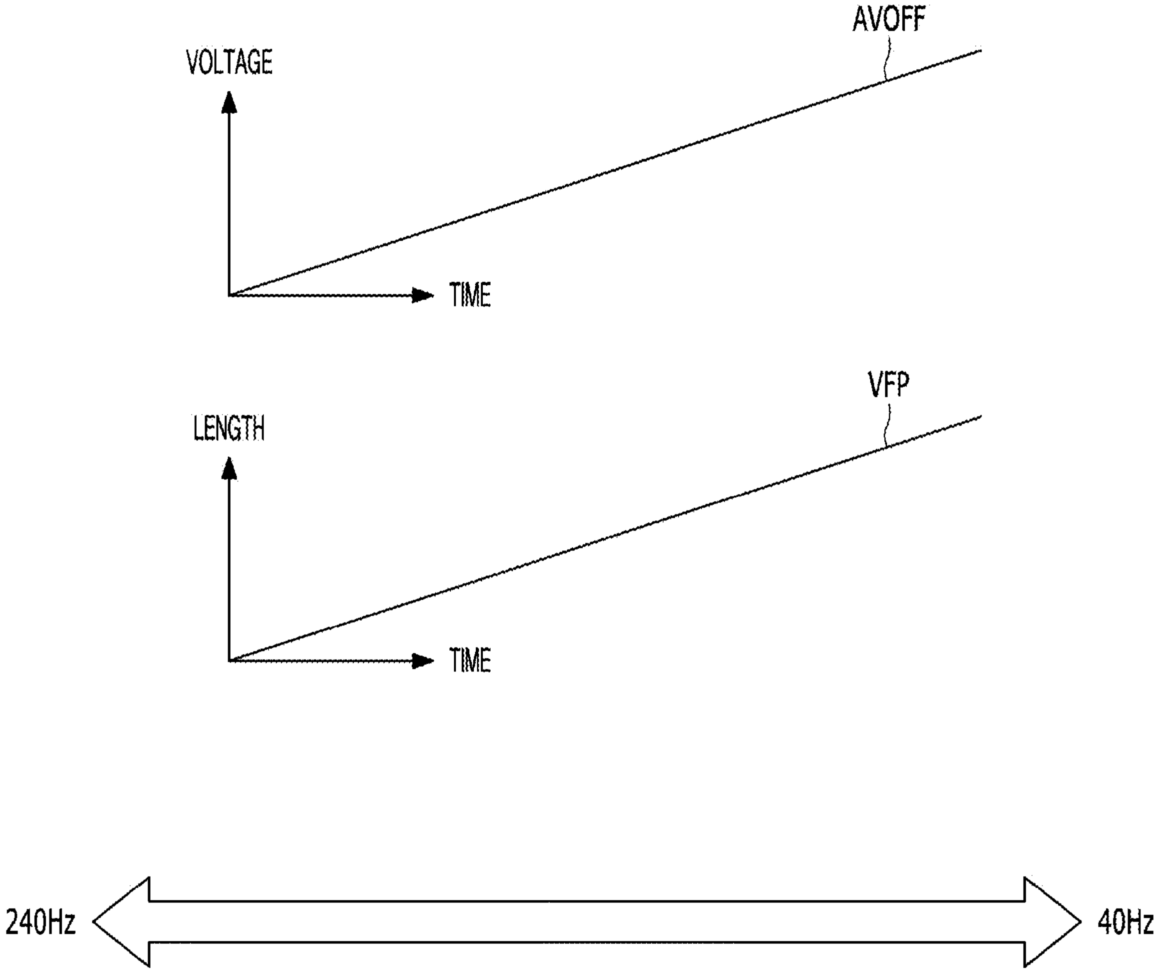
FIG. 16 is a diagram illustrating an example where a level of a gate-off control voltage is linearly adjusted in real time in proportion to a length of a vertical front porch.

FIG. 16 is a diagram illustrating an example where a level of a gate-off control voltage is linearly adjusted in real time in proportion to a length of a vertical front porch.

Referring to FIG. 16, the flicker compensation circuit according to the present embodiment may linearly increase a level of a gate-off control voltage AVOFF in real time in proportion to a length of a vertical front porch VFP.

During a vertical front porch VFP of a first frame, the flicker compensation circuit may linearly increase a level of the gate-off control voltage AVOFF up to a first target value (for example, AVOFF2) in real time, based on a real-time count value of a first length of the vertical front porch VFP, and during a vertical front porch VFP of a second frame, the flicker compensation circuit may linearly increase a level of the gate-off control voltage AVOFF up to a second target value (for example, AVOFF4) in real time, based on a real-time count value of a second length of the vertical front porch VFP.

In this case, the second length of the vertical front porch VFP may be longer than the first length of the vertical front porch VFP, and the second target value of the gate-off control voltage AVOFF may be greater than the first target value of the gate-off control voltage AVOFF. Accordingly, a leakage current may more increase in the second frame than the first frame.

Figure 17:
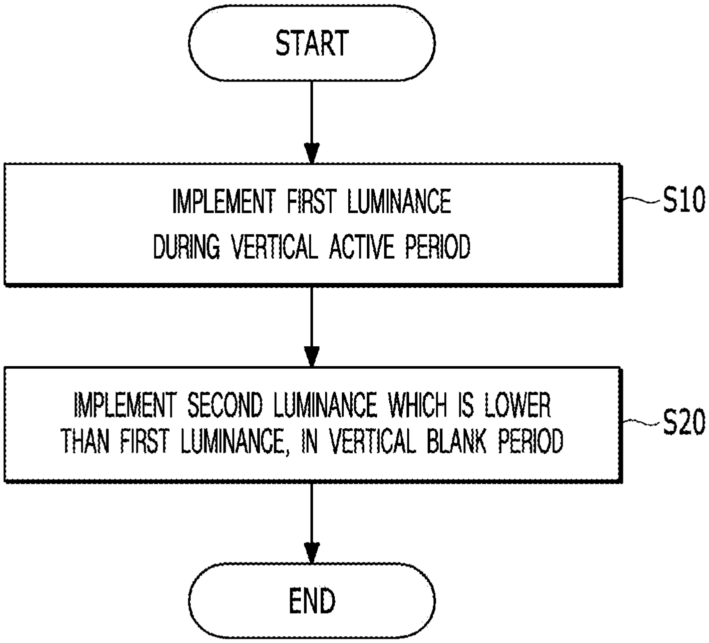
FIG. 17 is a diagram illustrating a flicker compensation method of a frequency variable display apparatus according to the present embodiment.

FIG. 17 is a diagram illustrating a flicker compensation method of a frequency variable display apparatus according to the present embodiment.

Referring to FIG. 17, the flicker compensation method of the frequency variable display apparatus according to the present embodiment may write an input image in subpixels in a vertical active period, where a data enable signal swings, of one frame to implement target luminance in the subpixels (S10).

Subsequently, the flicker compensation method of the frequency variable display apparatus according to the present embodiment may cause a leakage current flowing from the subpixels to signal lines corresponding thereto in a vertical blank period, where the data enable signal does not swing, of the one frame to implement flicker compensation luminance which is lower than the target luminance in the subpixels (S20).

The present embodiment may realize the following effect.

The present embodiment may decrease a recognition luminance deviation occurring in a rapid change condition of a frame frequency, thereby considerably improving display quality.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure including the following claims.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A frequency variable display apparatus, comprising:

a display panel including a plurality of subpixels;

an image driving circuit configured to write an input image in the plurality of subpixels in a vertical active period of a frame to implement a target luminance in the plurality of subpixels, in response to that a data enable signal swings; and a flicker compensation circuit configured to cause a leakage current to flow from the plurality of subpixels to signal lines corresponding thereto in a vertical blank period of the frame to implement a flicker compensation luminance which is lower than a target luminance in the plurality of subpixels, in response to that the data enable signal does not swing, wherein the flicker compensation circuit is configured to output a gate-off control voltage so as to cause a leakage current to flow from the plurality of subpixels to the signal lines corresponding thereto in the vertical blank period, and wherein the gate-off control voltage is used to generate a 3-level scan signal along with a gate on voltage and a gate off voltage, and the gate-off control voltage is lower than the gate on voltage and higher than the gate off voltage.

2. The frequency variable display apparatus of claim 1, wherein the vertical blank period comprises a vertical back porch arranged previously to the vertical active period in the frame and a vertical front porch arranged next to the vertical active period in the frame, a length of the vertical back porch is a constant value regardless of a length variation of the frame, and a length of the vertical front porch varies in proportion to a length of the frame.

3. The frequency variable display apparatus of claim 2, further comprising a sensing circuit configured to sense an electrical characteristic of each of the plurality of subpixels, in the vertical back porch.

4. The frequency variable display apparatus of claim 2, wherein the flicker compensation circuit is configured to cause the leakage current to flow from the plurality of subpixels to the signal lines corresponding thereto in the vertical front porch to implement the flicker compensation luminance which is lower than the target luminance in the plurality of subpixels.

5. The frequency variable display apparatus of claim 4, wherein the flicker compensation circuit is configured to output the gate-off control voltage in the vertical front porch.

6. The frequency variable display apparatus of claim 5, wherein the flicker compensation circuit is configured to increase a level of the gate-off control voltage in proportion to a length of the vertical front porch, and the leakage current increases as the level of the gate-off control voltage increases.

7. The frequency variable display apparatus of claim 6, wherein the flicker compensation circuit is configured to increase the level of the gate-off control voltage step by step in real time in proportion to the length of the vertical front porch.

8. The frequency variable display apparatus of claim 7, wherein the flicker compensation circuit is configured to:

during a vertical front porch of a first frame, increase step by step the level of the gate-off control voltage up to a first target value, based on a real-time count value of a first length of the vertical front porch, during a vertical front porch of a second frame, increase step by step the level of the gate-off control voltage up to a second target value, based on a real-time count value of a second length of the vertical front porch, wherein the second length of the vertical front porch is longer than the first length of the vertical front porch, and the second target value of the gate-off control voltage is greater than the first target value of the gate-off control voltage, and the leakage current increases more in the second frame than in the first frame.

9. The frequency variable display apparatus of claim 6, wherein the level of the gate-off control voltage increases linearly in real time in proportion to the length of the vertical front porch.

10. The frequency variable display apparatus of claim 9, wherein the flicker compensation circuit is configured to:

during a vertical front porch of a first frame, increase linearly the level of the gate-off control voltage up to a first target value, based on a real-time count value of a first length of the vertical front porch, during a vertical front porch of a second frame, increase linearly the level of the gate-off control voltage up to a second target value, based on a real-time count value of a second length of the vertical front porch, wherein the second length of the vertical front porch is longer than the first length of the vertical front porch, and the second target value of the gate-off control voltage is greater than the first target value of the gate-off control voltage, and the leakage current increases more in the second frame than the in first frame.

11. The frequency variable display apparatus of claim 5, wherein the flicker compensation circuit is further configured to output a first fixed voltage to data lines of the signal lines during the vertical front porch and output a second fixed voltage to reference voltage lines of the signal lines, so as to implement the flicker compensation luminance in the plurality of subpixels during the vertical front porch, the first fixed voltage is lower than data voltages provided the plurality of subpixels in the vertical active period, and the second fixed voltage is lower than a reference voltage provided to the plurality of subpixels in the vertical active period.

12. The frequency variable display apparatus of claim 4, wherein each of the plurality of subpixels comprises:

a driving transistor including a gate electrode connected to a first node, a drain electrode connected to a high level source voltage, and a source electrode connected to a second node;

a light emitting device including an anode electrode connected to the second node and a cathode electrode connected to a low level source voltage;

a first switch transistor configured to control a flow of a current between the first node and a data line, based on a 3-level scan signal from a gate line; and a second switch transistor configured to control a flow of a current between the second node and a reference voltage line, based on the 3-level scan signal from the gate line, wherein the 3-level scan signal swings between a gate on voltage and a gate off voltage in the vertical active period and maintains a gate-off control voltage between the gate on voltage and the gate off voltage in the vertical front porch.

13. The frequency variable display apparatus of claim 12, wherein a level of the gate-off control voltage is configured to increase in proportion to a length of the vertical front porch, and the leakage current is configured to increase as a level of the gate-off control voltage increases.

14. A flicker compensation method of a frequency variable display apparatus including a display panel that include a plurality of subpixels, the flicker compensation method comprising:

writing an input image in the plurality of subpixels in a vertical active period of a frame to implement a target luminance in the plurality of subpixels, when a data enable signal swings; and outputting a gate-off control voltage so as to cause a leakage current to flow from the plurality of subpixels to signal lines corresponding thereto in a vertical blank period of the frame to implement a flicker compensation luminance which is lower than the target luminance in the plurality of subpixels, when the data enable signal does not swing, wherein the gate-off control voltage is used to generate a 3-level scan signal along with a gate on voltage and a gate off voltage, and the gate-off control voltage is lower than the gate on voltage and higher than the gate off voltage.

* * * * *